(12) United States Patent
Zheng et al.

(10) Patent No.: US 7,398,645 B2
(45) Date of Patent: Jul. 15, 2008

(54) REVERSING FLOW CATALYTIC CONVERTER FOR INTERNAL COMBUSTION ENGINES

(75) Inventors: Ming Zheng, Windsor (CA); Edward A. Mirosh, Calgary (CA); Graham T. Reader, Lakeshore (CA)

(73) Assignee: Smart Muffler Corporation, Calgary, Alberta (CA)

( * ) Notice: Subject to any disclaimer, the term of this patent is extended or adjusted under 35 U.S.C. 154(b) by 258 days.

(21) Appl. No.: 11/212,608

(22) Filed: Aug. 29, 2005

(65) Prior Publication Data

US 2006/0266025 A1    Nov. 30, 2006

(30) Foreign Application Priority Data

May 24, 2005    (CA)    .................................... 2508159

(51) Int. Cl.
*F01N 3/00* (2006.01)
(52) U.S. Cl. .............................. 60/288; 60/289; 60/292; 60/296
(58) Field of Classification Search .................... 60/277, 60/287, 288, 292, 296
See application file for complete search history.

(56) References Cited

U.S. PATENT DOCUMENTS

| | | | | |
|---|---|---|---|---|
| 3,189,417 | A | | 6/1965 | Houdry et al. |
| 5,768,888 | A | * | 6/1998 | Matros et al. ................. 60/274 |
| 6,148,613 | A | * | 11/2000 | Klopp et al. ................... 60/296 |
| 6,212,885 | B1 | * | 4/2001 | Hirota et al. .................. 60/288 |
| 6,588,203 | B2 | * | 7/2003 | Hirota et al. .................. 60/297 |
| 6,655,133 | B2 | * | 12/2003 | Mikami et al. ................ 60/296 |

(Continued)

Primary Examiner—Thomas Denion
Assistant Examiner—Loren Edwards
(74) Attorney, Agent, or Firm—Gowling Lafleur Henderson LLP; D. Doak Horne

(57) ABSTRACT

A compact reversing flow catalytic converter with protection from overheating includes a valve unit which directs exhaust gases through a container filled with catalytic material to permit a bypass of catalytic material when a temperature of the material exceeds a predetermined threshold. The container defines a U-shaped gas passage that communicates with two ports at the top of the container. The valve unit is mounted to the top of the container and includes an intake and an exhaust cavity. The valve unit includes a valve disk having two openings therethrough. The valve disk rotates around perpendicular central axis between a first, a second and third positions. When overheating of the catalytic material is predicted, a controller relinquishes control of the valve disk and a center return mechanism rotates the valve disk to a third position, in which each of the openings communicates with both ports so that the exhaust gas flow bypasses catalytic material. The catalytic material is thus protected from damage due to overheating. The advantage is a compact, reliable, highly efficient catalytic converter that is inexpensive to manufacture, durable, and adapted for extended service life. An alternate version of the compact reversing flow controller is also described wherein the valve unit and container are essentially as described above but the valve disk is a four position disk with the fourth position blocking communication between the valve housing and the container isolating the monolith so that maximum heat is retained during engine shut down. The valve is driven by a stepper motor that moves and holds the valve to its four positions including block, bypass, forward and reverse flow. The alternate version also replaces the oxidizing flow-through monolith with an oxidizing filter trap and adds a fuel injection system under control of the controller so that measured amounts of fuel can be injected into the valve inlet to enhance oxidation.

57 Claims, 10 Drawing Sheets

U.S. PATENT DOCUMENTS

| | | | |
|---|---|---|---|
| 6,679,052 B2 * | 1/2004 | Nakatani et al. | 60/297 |
| 6,823,664 B2 * | 11/2004 | Nakatani et al. | 60/295 |
| 6,823,665 B2 * | 11/2004 | Hirota et al. | 60/296 |
| 6,874,316 B2 * | 4/2005 | Nakatani | 60/286 |
| 6,945,034 B2 * | 9/2005 | Ueno et al. | 60/288 |
| 7,040,087 B2 * | 5/2006 | Nakatani et al. | 60/286 |
| 2006/0117742 A1 * | 6/2006 | Bellinger et al. | 60/288 |

* cited by examiner

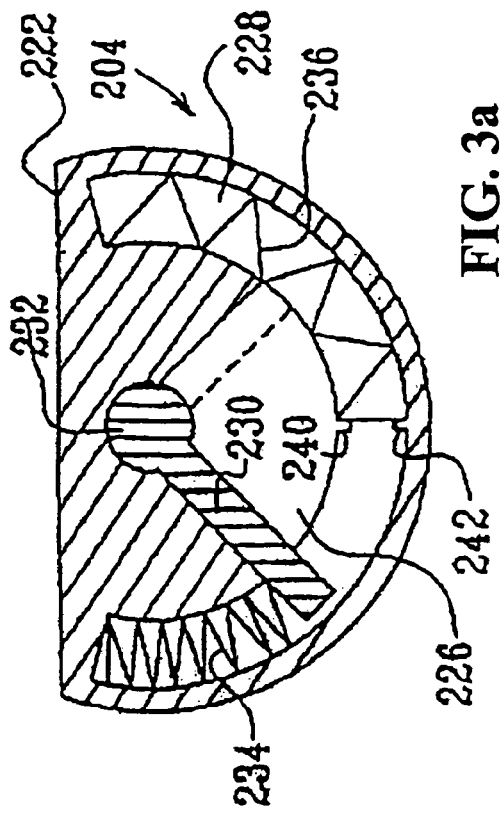
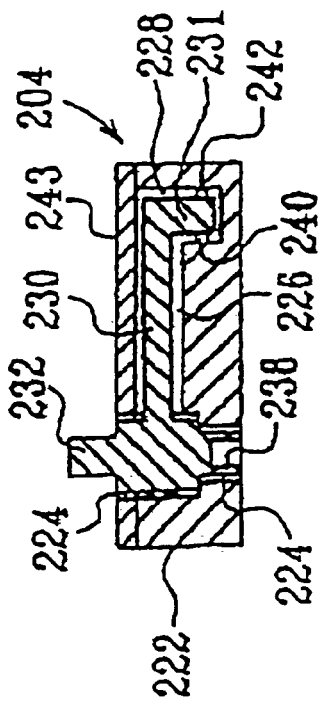
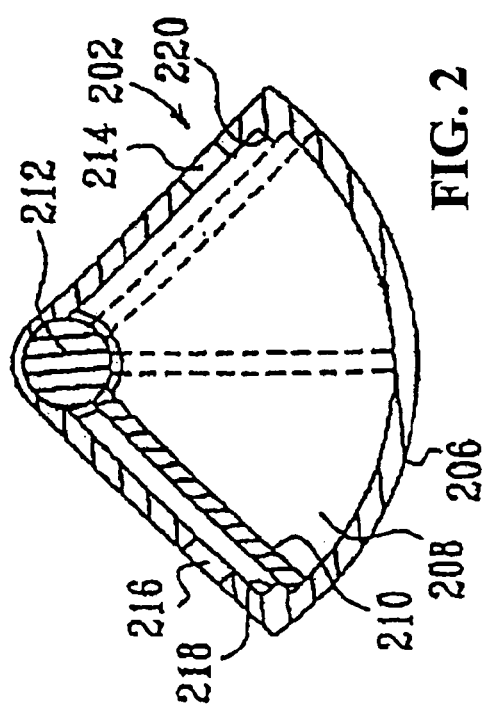
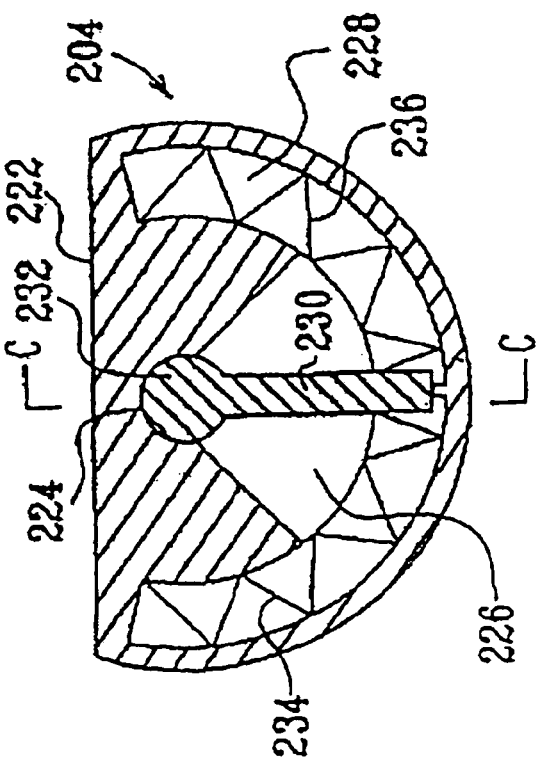

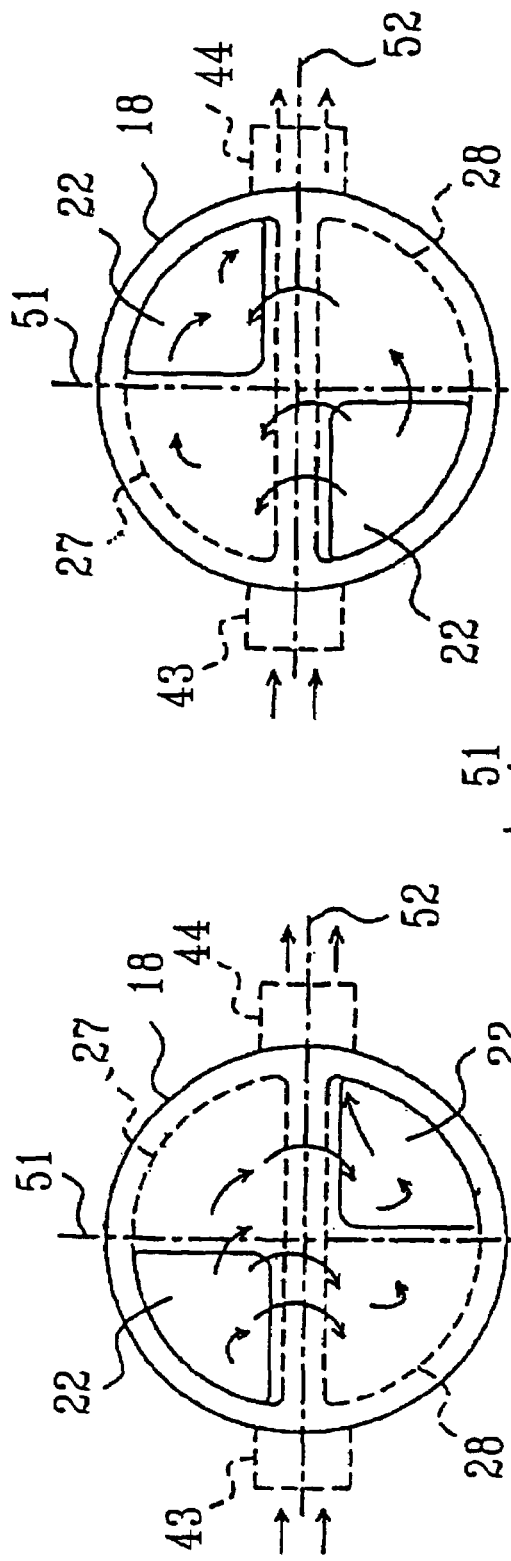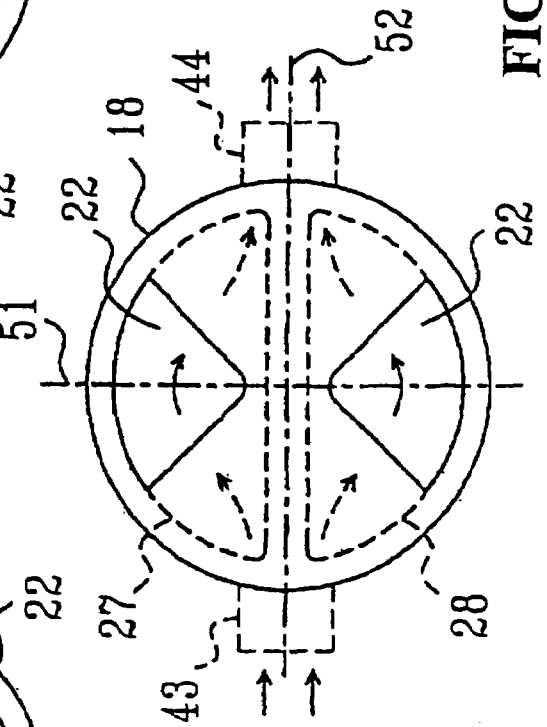

REVERSING FLOW CATALYTIC CONVERTER FOR INTERNAL COMBUSTION ENGINES

INTRODUCTION

The present invention relates to catalytic converters for internal combustion engines, and in particular, to an improved reversing flow catalytic converter for treating exhaust gases from internal combustion engines.

BACKGROUND OF THE INVENTION

A problem relating to catalytic converters for internal combustion engines, such as the prior art reversing flow catalytic converter for internal combustion engines disclosed in U.S. Pat. No. 6,148,613, is overheating. Lean burn combustion systems for fuel-efficient vehicles are particularly hard on exhaust after-treatment systems because excessive oxygen is always present in the exhaust. For example, the exhaust of diesel dual fuel (DDF) engines, which is one type of diesel engine, normally contains more than 5% volumetric oxygen after combustion. Under partial load the surplus of oxygen in the exhaust may be higher than 10% by volume. Under such circumstances, any engine management problems that result in excessive fuel in the exhaust, will generally damage exhaust after-treatment system due to overheating.

If a fuel management problem occurs, a large amount of the excess fuel delivered to the engine can pass through it and into the engine exhaust. That fuel will burn inside the catalyst if sufficient oxygen is available and the catalyst has reached catalytic temperature. For example, the complete burning of 2% of methane in the exhaust, can raise the temperature of exhaust gases by about 420° C., in addition to the 600° C. temperature of the exhaust as it is ejected from the engine. Consequently, the rate of temperature rise in the catalyst can reach 20 to 30° C./second, if the monoliths are metallic. Besides the catalytic burning of methane, any combustible matter such as soot accumulated on the catalyst surface, will also be rapidly oxidized under such high temperatures. The burning of accumulated soot will escalate and prolong the temperature rise. The thermal wave oscillation produced by the reverse flow process will also expedite the rise of the peak temperature of the catalyst substrate. Once the catalyst temperature reaches 1200° C., a metallic substrate will begin to soften and subsequently lose mechanical strength. Further temperature rise will cause collapse of the substrate and eventual melt-down will occur when it is heated to 1400-1450° C. A detrimental uncontrolled temperature rise can damage a catalyst in less than 20 seconds.

In the prior art, when a catalyst protection mode is required for a gasoline engine, an extremely rich fuel/air mixture is delivered to the engine. Since all oxygen is basically consumed inside the engine during the over-rich combustion process, the engine exhaust contains no oxygen. The large amount of excessive fuel from the engine pulls down the catalyst temperature. In this type of catalyst protection mode, however, the carbon monoxide content of the exhaust gas is undesirably very high.

However, for lean burn systems such as diesel or dual fuel engines, the excessive fuel will not cool down the catalyst temperature because of the presence of a high concentration of oxygen in the exhaust. Furthermore, lean burn systems cannot burn stoichiometric fuel/air mixtures because of knocking restrictions. For knock-free operation of a dual fuel engine, the original compression ratio of the baseline diesel engine requires the pre-mixed natural gas/air mixture to be generally leaner than $\lambda=1.5$.

As well, the concept of the reversing flow catalytic converter has been found to offer nearly continuous oxidation of exhaust components, mainly unburned hydrocarbons and carbon monoxide, when used after natural gas or dual fuel engines, in a 13 mode test cycle. For this reason, such a catalytic converter will likely not require supplementary heat added to the converter to maintain oxidation temperature. However, for a diesel engine there are fewer hydrocarbons and CO in the exhaust stream providing less fuel in the emissions. Engine fuel will need to be added to the exhaust stream during idle and low power operation of the engine in order to maintain an oxidation temperature sufficient to convert Co and hydrocarbons (including particulates), however, a considerably lesser amount of fuel than would be required by a conventional uni-directional oxidation catalyst. For this reason, addition of fuel can also result in overheating of the catalyst, if too much fuel is added.

U.S. Pat. No. 6,148,613 discloses a prior art reversing flow catalytic converter for internal combustion engines. Such device 10 includes a valve housing 14 which reversibly directs exhaust gases through a "U" shaped passage having a catalytic material therein. A valve disk 42 having two openings 48 therein rotates around a central axis, wherein in a first position of such rotatable valve disk 42 the exhaust gases enter the exhaust cavity from an exhaust pipe and pass through one of the openings in valve disk 42 into the "U" shaped passage. In the second position of the rotatable valve disk 42, the disk 42 and corresponding openings 48 therein are rotated 90° so that each opening 48 communicates with the same cavity within the valve housing 14, but a different one of the ports communicating with the U-shaped passage, so that gas flow through the u-shaped passage is thereby able to be reversed.

Disadvantageously, prior art devices such as the type disclosed in U.S. Pat. No. 6,148,613 lack a safeguard system to protect such reversing flow catalytic converter from overheating, as may arise under any one or more of the conditions explained above.

Further, there exists a need for a continuously oxidizing filter particulate trap for diesel engine exhausts.

SUMMARY OF THE INVENTION

It is accordingly an object of the present invention to provide an improved reversing flow catalytic converter system for treating exhaust gases from an internal combustion engine, which system includes a compact valve structure incorporated in the converter as well as a safeguard system to protect the catalyst and converter from overheating.

Another object of the present invention is to provide an improved reversing flow catalytic converter system for treating exhaust gases from an internal combustion engine which has a compact structure for efficient performance, minimal heat loss, and mechanical simplicity.

Yet another object of the present invention is to provide a three-way valve for a reversing flow catalytic converter which overcomes the shortcomings of the prior art discussed above.

A further object of the present invention is to provide a reversing flow catalytic converter having a bypass system to protect the reversing flow catalytic converter from overheating.

A still further object of the present invention is to provide a three-way valve for a reversing flow catalytic converter, that is maintained in a neutral position to permit exhaust gases to bypass the catalytic converter when the valve is not actuated.

A further object of the present invention is to optionally provide a reversing flow catalytic converter with an oxidizing filter trap that may or may not be coated with catalytic material, to trap, hold and oxidize particulates, in place of the oxidation catalytic substrate within the reversing flow catalytic converter.

A further object of the present invention is to optionally provide a reversing flow catalytic converter with a means of injecting a controlled amount of engine fuel upstream of the reversing flow catalytic converter when required to maintain a continuous oxidation temperature. The catalytic converter monolith may or may not be coated with catalytic material, depending on the application and upon the amount of fuel normally present and additionally injected upstream of the reversing flow catalytic converter.

A still further object of the present invention is the optional provision of an alternate four or more way valve that is actuated by a rotary stepping motor to at least four distinct valve positions including: forward, reverse, bypass and blocked flow positions.

A further object of the present invention is the optional provision of a means with a blocking valve to thermally isolate the oxidizing monolith of the reversing flow converter when the internal combustion engine is shut down, and to return the blocking valve to normal operation before the internal combustion engine is started up.

Accordingly, in one broad aspect of the invention, a reversing flow catalytic converter for treating exhaust gases from an internal combustion engine is provided, comprising:

a container having a gas flow passage therein and a top end having a first port and a second port that respectively communicate with the gas flow passage;

a catalytic material in the gas flow passage adapted for contacting the exhaust gases that flow through the gas flow passage;

a valve for reversing an exhaust gas flow through the gas flow passage, including a valve housing with an intake cavity and an exhaust cavity, mounted to the top end of the container, the intake cavity adapted for connection to an exhaust gas pipe from said engine and exhaust cavity adapted for connection to a tail pipe for egress of said exhaust gas from said converter; and a valve component for reversing gas flow operably mounted to the valve housing, adapted to moved between a first position in which the intake cavity communicates with the first port and the exhaust cavity communicates with the second port, a second position in which the intake cavity communicates with the second port and the exhaust cavity communicates with the first port, and a third position which allows the intake cavity to communicate with the exhaust cavity; and a controller for controlling movement of the valve component between the first and second positions during normal operating temperatures for the catalytic converter and otherwise permitting movement of the valve component to the third position for abnormal operating temperatures.

Alternatively, in another aspect of such first aspect, the present invention comprises a reversing flow catalytic converter for treating exhaust gases from an internal combustion engine is provided, comprising:

a container having a gas flow passage therein and a top end having a first port and a second port that respectively communicate with the gas flow passage;

a catalytic material in the gas flow passage adapted for contacting the exhaust gases that flow through the gas flow passage;

a valve for reversing an exhaust gas flow through the gas flow passage, including a valve housing with an intake cavity and an exhaust cavity, mounted to the top end of the container, the intake cavity adapted for connection to an exhaust gas pipe from said engine and exhaust cavity adapted for connection to a tail pipe for egress of said exhaust gas from said converter; and a valve component for reversing gas flow operably mounted to the valve housing, adapted to the be moved between a first position in which the intake cavity communicates with the first port and the exhaust cavity communicates with the second port, a second position in which the intake cavity communicates with the second port and the exhaust cavity communicates with the first port, and a third position which allows the intake cavity to communicate with the exhaust cavity; and a controller for controlling movement of the valve component between the first and second positions during normal operating temperatures for the catalytic converter and to the third to permit bypass of exhaust gas without passing through said catalyst material during certain other temperatures for the catalytic converter.

Preferably, the valve housing has an interior cavity with an open bottom and a transverse wall that divides the cavity into two halves that respectively form the intake cavity and the exhaust cavity. The valve component may include a plate which is rotatably mounted to the valve housing at the open bottom, and rotates about a central axis that is perpendicular to the plate, the plate having a first opening and second opening therethrough which communicate respectively with each of the ports, and one of the intake and exhaust cavities.

More preferably, the gas flow passage is formed within an interior chamber of the container, the interior chamber being separated by a transverse plate into two parts which respectively form a first chamber section and a second chamber section. The two sections communicate with each other, and each of the chamber sections communicates with one of the first and second ports. The container further comprises a gas permeable material which contains the catalytic material. The gas permeable material preferably comprises a plurality of monoliths having a plurality of cells extending therethrough, the monoliths being coated with a catalytic material.

According to a second aspect of the present invention, there is provided a reversing flow catalytic converter for exhaust gases, the converter comprising a container which has top end with a first port and a second port that are in fluid communication with each other so that the exhaust gases introduced into one of the first and second ports flow through a catalytic material in the container. The valve structure comprises a valve housing including an intake cavity and an exhaust cavity, adapted to be mounted to the top end of the container. The intake cavity adapted for connection of an exhaust gas pipe and the exhaust cavity is adapted for connection of a tail pipe. A valve component is provided for reversing gas flow operably mounted in the valve housing. The valve is adapted to be moved between a first position in which the intake cavity communicates with the first port and the exhaust cavity communicates with the second port, and a second position in which the intake cavity communicates the second port and the exhaust cavity communicates with the first port. The valve structure further includes a center return mechanism associated with the valve component for moving the valve component to a third position in which the intake cavity communicates with the exhaust cavity through the valve component when the valve component is not actuated to move to one of the first and second positions. Alternatively, the third position may be achieved by positive action of a controller and actuator.

According to a third aspect of the present invention, there is provided a catalytic converter for treating exhaust gases from an internal combustion engine. The catalytic converter includes a container having a gas flow passage therein and a top end having a first port and a second port which respectively communicate with the passage. A catalytic material is provided in the gas flow passage and contacts the exhaust gases which flow through the passage. The catalytic converter has a valve for reversing the exhaust gas flow through the gas flow passage, including a valve housing with an intake cavity and an exhaust cavity, mounted to the top end of the container. The intake cavity is adapted for connection of an exhaust gas pipe and the exhaust cavity is adapted for connection of a tail pipe. The valve also includes a valve component for reversing gas flow, operably mounted in the valve housing, and adapted to be moved between the first, second, and third positions. In the first position, the intake cavity communicates with the first port and the exhaust cavity communicates with the second port. In the second position, the intake cavity communicates with the second port and the exhaust cavity communicates with the first port. In the third position, the intake cavity communicates with the exhaust cavity. A controller controls movement of the valve component between the first and second positions, and movement of the valve component to the third position, if required to protect the catalytic material from overheating.

According to a fourth aspect of the present invention, a safeguard system is provided to inhibit overheating a reversing flow catalytic converter. In addition to controlling the valve component for reversing flow bypass operation, the controller is also adapted to indirectly control fuel supply to the engine, in order to protect the catalytic material from overheating.

According to fifth aspect of the invention, there is provided a method for preventing overheating of a reversing flow catalytic converter. The reversing flow catalytic converter includes a valve adapted for connection of an exhaust gas pipe and a tail pipe, and associated with first and second ports of a container for reversing exhaust gas flow through a catalytic material in the container. The method comprises steps of monitoring temperatures of the catalytic material, and controlling a valve mechanism to permit the exhaust gases to flow from the exhaust gas pipe to the tail pipe without passing through the catalytic material when the temperature of the catalytic converter exceeds a predetermined threshold. The method also preferably includes steps of calculating the rate of temperature rise in the catalytic material, and controlling the valve mechanism to permit the exhaust gases to flow from the exhaust gas pipe to the tail pipe without passing through the catalytic material when the rate of temperature rise exceeds a predetermined threshold. A further optional step adjusts engine operation to reduce total hydrocarbon and carbon monoxide volume in the exhaust gas flow.

The safeguard system in accordance with the present invention, protects the catalytic material from overheating when an abnormal rate of temperature rise is detected. The bypass of exhaust gases around the catalyst is the primary safeguard mechanism. During bypass, the exhaust gases do not flow through the monoliths in the catalytic converter. Thus, the inner catalyst is shielded from the flow of the fuel-oxygen mixture contained in the engine exhaust. Extensive testing has shown that once the exhaust flow to the catalyst is stopped by the bypass mechanism, the catalyst center temperature comes down quickly even if the exhaust gases are rich in both fuel and oxygen. However, if overheating occurs, the engine fuel supply is preferably adjusted to reduce the total hydrocarbon and carbon monoxide volume in the exhaust, as well as the temperature of the exhaust gases. In bypass mode, exhaust gases rich in fuel and oxygen will burn in the valve housing if the temperature of the valve housing is high enough. The high temperature resulting from the burning of the fuel in the valve housing retards cooling of the catalyst, and may damage the valve structure. Therefore, control of the fuel supply is preferable when overheating occurs. Besides, in the bypass mode, the exhaust gases are not treated by the catalyst and therefore, the concentrations of hydrocarbons and carbon monoxide in the exhaust gas generally increases.

According to a sixth aspect of the invention, there is provided an option to replace the oxidation catalyst within the reversing flow catalytic converter with a catalytic filter trap. In this variation of the reversing flow catalytic converter, a method is provided to entrap particulates and to hold them for a period of time to allow effective oxidation of the particulate matter when the trap is held at a continuous oxidation temperature by the temperature monitoring and control system. In this sixth aspect and as a second option, the oxidation catalyst may be replaced by a filter monolith that is not coated with catalyst.

According to a seventh aspect of the invention, there is optionally provided a method by which engine fuel may be injected through an injector valve that provides a mist of engine fuel into the inlet piping of the reversing flow converter at a location downstream of the inlet flange and upstream of the valve housing, or into the central area of the reversing flow converter within the flow redirection bowl. The method comprises of steps of monitoring temperature of the monolith material and controlling a fuel injector valve mounted on the inlet piping of the reversing flow converter to inject metered quantities of fuel required to maintain a preset oxidation temperature of the monolith material. The method includes the provision of a control interlock such that in the event of overheating for any reason, the power to the fuel injector valve will be locked out until the overheat condition is removed. Additionally, when an overheat event occurs, the engine fuel supply will be adjusted to reduce total hydrocarbons and carbon monoxide volume in the exhaust.

According to an eighth aspect of the invention, there is optionally provided, a four or more position valve and rotary stepper motor actuator which includes as a minimum, valve positions for; forward, reverse, bypass and blocked exhaust flow. In this aspect, the valve position is determined by a pneumatic or electric stepper motor that is driven by a control method similar to that described earlier for the reverse flow oxidizing catalytic converter, comprised of steps of monitoring temperature and rate of temperature rise of the oxidizing filter trap and controlling valve position such that exhaust gases are permitted to flow from the engine to the tail pipe without passing through the oxidizing filter trap when the temperature of the monolith exceeds a predetermined threshold. This is the third or bypass valve position. Further, according to the eighth aspect of the invention, there is also provided a fourth or blocking position of the valve. The control method and stepper motor position the valve to this fourth position when the engine ignition key is in the "off" position. This aspect allows the oxidizing filter container to be completely blocked or isolated so that heat entrapped within the monolith will be retained to the maximum extent of time while the engine is shut down. The control method allows the blocking position to be changed to either the forward or reverse flow positions when the ignition key is in the "on" position.

The improved reversing flow catalytic converter of the present invention, having an appropriate controller, actuator means, and valve, will act to isolate and block the passages leading to the filter monolith when the engine is shut down, such that heat will be further retained within the monolith so that when the engine is restarted, the monolith will be able to oxidize fuel components quickly for short engine shut down periods.

Other features and advantages of the invention will be more clearly understood with reference to the preferred embodiments described below.

BRIEF DESCRIPTION OF THE DRAWINGS

The invention will now be further described by way of example only, and with reference to the accompanying drawings, in which:

FIG. 2 is a cross-sectional view taken along line A-A of FIG. 1 to show the structure of a rotary actuator for driving the valve;

FIG. 3a is a cross-sectional view taken along line B-B of FIG. 1 to illustrate a center return mechanism in a position corresponding to that of the actuator shown in FIG. 2;

FIG. 3b is a cross-sectional view of the center return mechanism shown in FIG. 3a, with the center return mechanism in position for bypass mode;

FIG. 4 is a longitudinal cross-sectional view of the center return mechanism taken along line C-C of FIG. 3b;

FIG. 5a is a bottom plan view of the improved valve disk and housing, showing the valve disk in a first position in which exhaust gases are routed in a first direction through the catalytic converter;

FIG. 5b is a bottom plan view of the improved valve disk and housing, showing the valve disk in a second position in which exhaust gases are routed in an opposite direction through the catalytic converter;

FIG. 5c is a bottom plan view of the improved valve disk and housing, showing the valve disk in a third position in which the exhaust gases bypass the catalytic material of the catalytic converter;

DETAILED DESCRIPTION OF THE PREFERRED EMBODIMENTS

Figure 1:
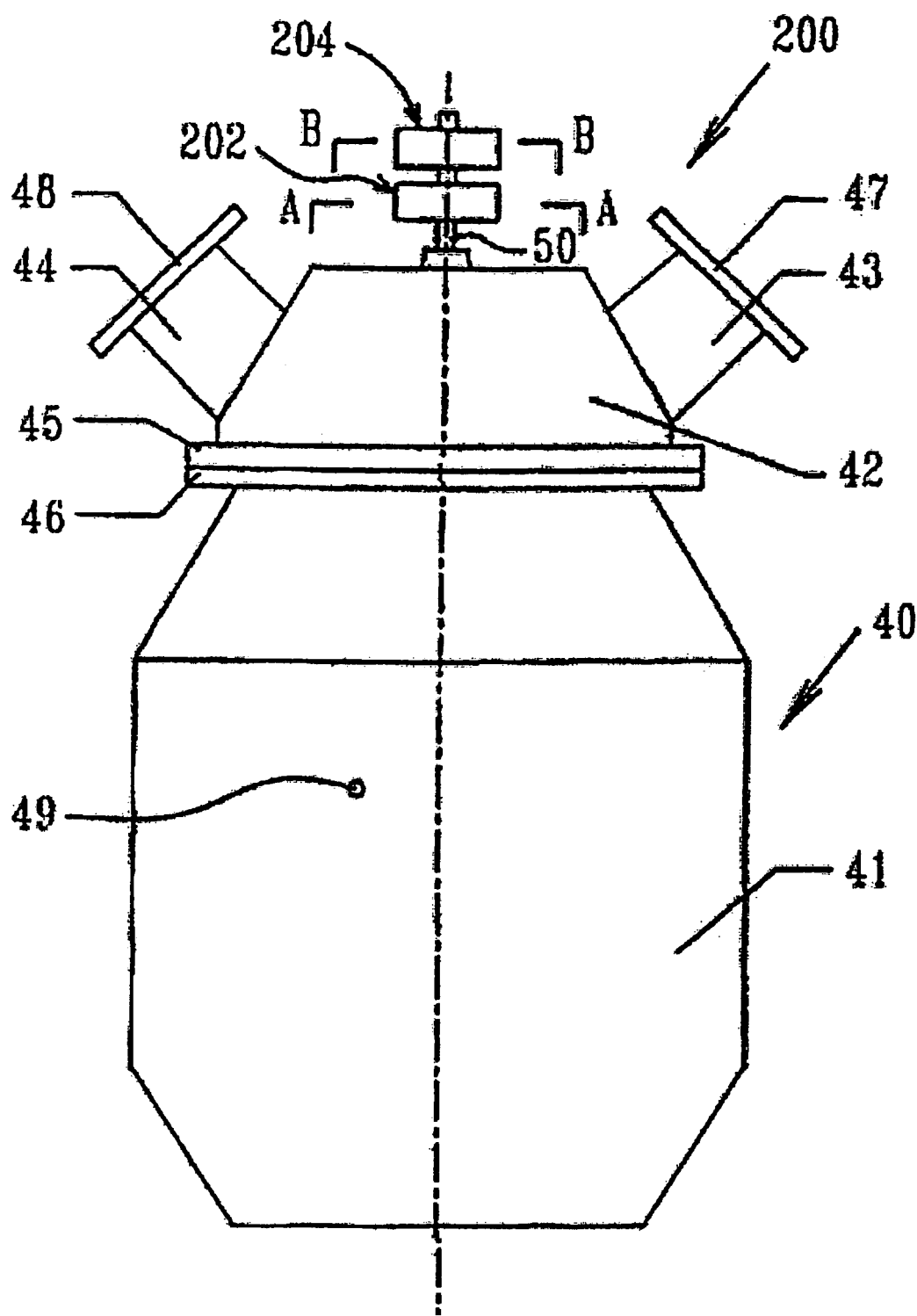
FIG. 1 is a side elevation view of the improved reverse flow catalytic converter of the present invention which includes a bypass mechanism to control overheating of the catalytic material in the catalytic converter.

FIG. 1 illustrates an improved catalytic converter 200 in accordance with an embodiment of the present invention which incorporates a safeguard system to inhibit overheating the catalyst monoliths.

With reference to FIG. 1, the catalytic converter 200 comprises a container 40 and valve housing 42 with a similar structure and components as described in U.S. Pat. No. 6,148,613. A rotary actuator 202 and a center return mechanism 204 are mounted on the drive shaft 50 of the valve disk 18. The rotary actuator 202 is controlled to periodically rotate the valve disk 18 between the first and the second positions to reverse gas flow through the container 40.

As shown in FIG. 2, the rotary actuator 202 includes a housing 206 which encloses a pressure chamber 208. A moveable vane 210 is mounted to drive shaft 212 which is adapted to be connected to the shaft 50 of the valve disk 18 to rotate together therewith. The housing 206 has a first opening 214 and a second opening 216 in the respective side walls of the housing 206 so that the moveable vane 210 rotates clockwise until it abuts a left stop member 218 when pressurized fluid is injected into the pressure chamber 208 through the first opening 214. This position of the moveable vane 210 corresponds to the first position of the valve disk 18 as shown in FIG. 5a, to permit the exhaust gases to flow through the container in a first direction. Similarly, the moveable vane 218 rotates counter clockwise until it abuts a right stop member 220, as shown in broken lines at the right side, when the pressurized fluid is injected into the pressure chamber 208 through the second opening 216. This position corresponds to the second position of the valve disk 18, as shown in FIG. 5b, to permit the exhaust gases to flow through the container 40 in the opposite direction.

As shown in FIGS. 3a, 3b and 4, the center return mechanism 204 includes a base block 222 having a circular bore 224 at an apex of triangular cavity 226. An annular groove 228 is formed in the block along an outer side of the triangular cavity 226 the annular groove 228 is recessed further than the triangular cavity 226. A swivel arm 230 is connected on one end to a pivot shaft 232 that is rotatably mounted in the bore 224 of the base block. A depending leg 231 depends from a free end of the swivel arm 230. Two coil springs 234 and 236 are retained in the annular groove 228, each is restrained between one end of the groove 228 and one side of the swivel arm 230. A connector 238 is integrally formed with the pivot shaft 232, having a square cross-section adapted to receive a square top end of pivot shaft 212(not shown) of the rotary actuator 202. The swivel arm member 230 is adapted to swivel within the triangular cavity 226 and compress one of the springs 234, 236 as it swivels. The other of the springs 234, 236 is retained between the other end of the annular groove and stop members 240, 242 that extend from opposite sides of the groove 228. The stop members 240 and 242 are spaced apart from each other to permit the depending leg 231 of the swivel arm 230 to pass through when the swivel arm 230 pivots from one side to the other. A cover 243 is provided to retain the swivel arm 230 and springs 234, 236 within the base block 222. When the pressure vane 210 of the rotary actuator 202 is at the left side, corresponding to the first position of the valve disk 18 shown in FIG. 5a, the swivel arm 230 of the center return mechanism 204 is located on the left side and compresses spring 234. When the pressure vane 210 of the rotary actuator 202 pivots to the right side as shown in the broken line at the right side of FIG. 2, the valve disk 18 is in the second position as shown in FIG. 5b. However, when the rotary actuator 202 is deactivated (no fluid pressure is applied to either side of the pressure vane 210), the swivel arm 230 of the center return mechanism 204 is forced by one of the springs 234, 236 to return to the central position shown in FIG. 3b. This moves the pressure vane 210 of the rotary actuator 202 to the central position shown in broken lines in FIG. 2. It also moves the valve disk 18 to the bypass position shown in FIG. 5c.

Figure 7:
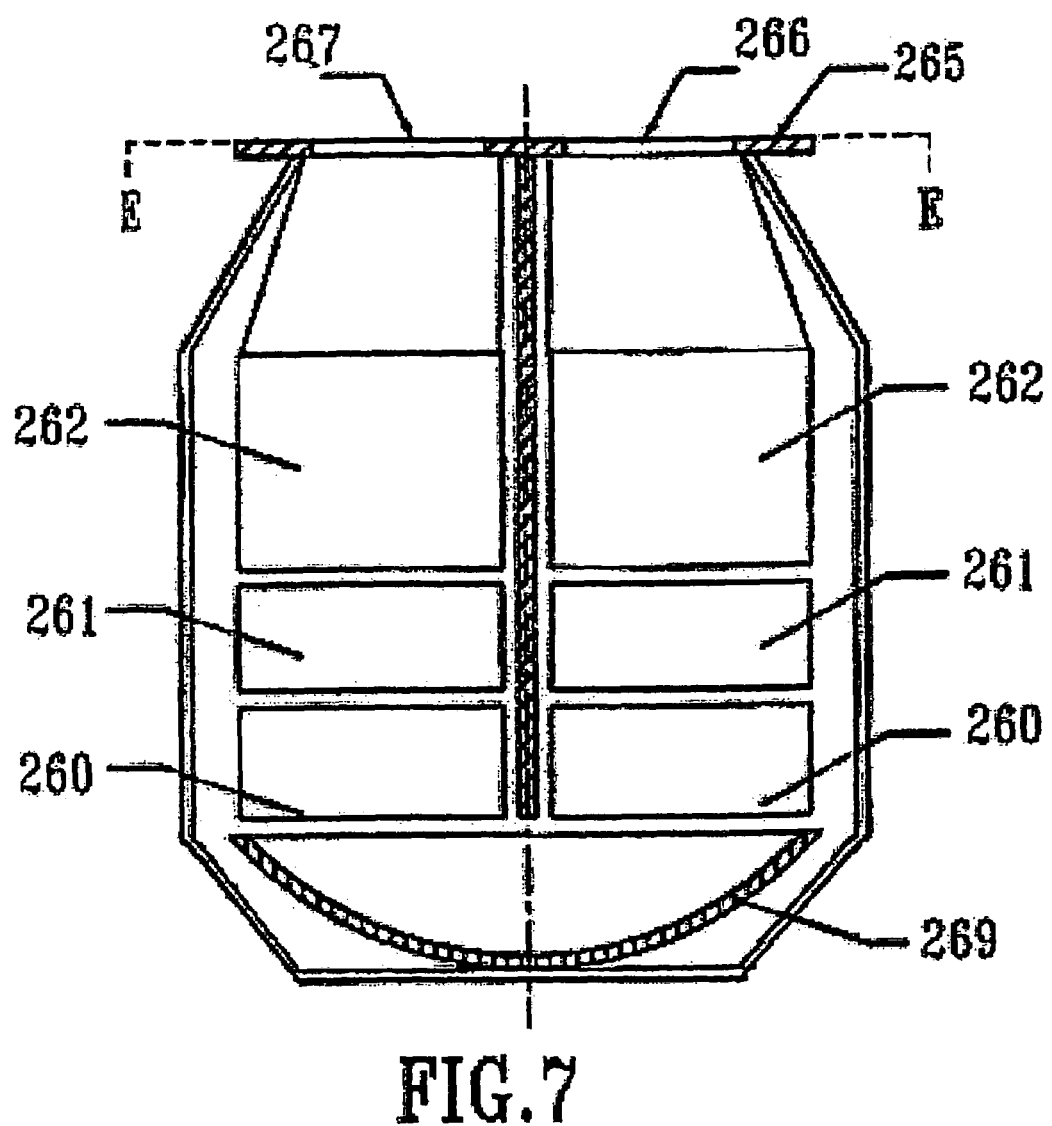
FIG. 7 is a longitudinal cross-sectional view of the canister portion of the improved catalytic converter along the line D-D of FIG. 8, showing an alternate arrangement for the monolith in which a catalytic particulate filter trap is installed within the reverse flow catalytic converter. In some applications the particulate filter trap monolith will not be coated with catalytic material.

FIGS. 5a, 5b and 5c. illustrate the valve disk 18 in its three positions, for respectively forward and reverse exhaust flow through the container 40 and for bypassing the catalytic material. For clearer illustration, these figures illustrate only a bottom plan view of the valve disk 18 sitting above the valve housing and below the adapter plate 46. With respect to FIGS. 5a, 5b, and 5c, references to "above" or "over" refer to portions of the reverse flow catalytic converter nearer to the bottom of FIG. 1, while references to "below" or "under" refer to portions of the reverse flow catalytic converter nearer to the top of FIG. 1. The exhaust gas inlet 43 and exhaust gas outlet 44 which are located below the valve disk 18, and the first port 27 and the second port 28 of adapter plate 46 which are located above the valve disk 18 are shown in broken lines. The vertical center line 51 indicates the position of the valve housing transverse wall which is also below the valve disk 18 and divides the interior cavity of the valve housing 42 into the intake cavity and exhaust cavity, similar to that shown in FIG. 3 of U.S. Pat. No. 6,148,613. The horizontal central line 52 indicates the position of the container transverse plate which is located above the valve disk 18 and separates the interior of the container into the first and second compartments, as shown in FIG. 7.

When the valve disk 18 is in the first position as shown in FIG. 5a, the gas flow enters intake cavity from the inlet 43 which is at the left side of central line 51 (valve housing separating wall) below the valve disk 18. The gas flow passes through the valve opening 22 (upper left) to enter the container through first port 27 and disperse into the cells of the catalytic material above within the container on the upper side of the transverse wall indicated by line 52. After the exhaust gas flow is forced through the catalytic material it exits on the opposite side of the container transverse wall which is on the lower side of line 52, and passes first through second port 28 and then through the valve opening 22 (lower right) to the exhaust cavity which is on the right side of line 51. The gas flow then exits through the outlet 44.

As shown in FIG. 5b, when the valve disk 18 is the second position, it is rotated 90° clockwise so that the gas flow entering the intake cavity through the inlet 43 passes through valve opening 22 which is now at the lower left quadrant. Therefore the gas flow must enter the container through the second port 28 and exit the container through the first port 27 so that the gas flow in the container is reversed, in comparison to the gas flow shown in FIG. 5a.

If during the reversing flow operation of the catalytic converter 40, the temperature of the catalyst material rises too quickly or is predicted to overheat the catalytic material, a controller places the catalytic converter in bypass mode. In bypass mode, the rotary actuator is deactivated by interrupting the pressurized fluid supply (not shown) or electric power Supply. When the rotary actuator 202 is deactivated, the swivel arm 230 of the center return mechanism 204 is forced by one of the springs 234 or 236, to return to its central position as shown in FIG. 3b. Thus, the center return mechanism 204 moves the valve disk 18 to the third (bypass) position which is between the first and second positions, as shown in FIG. 5c. The valve disk 18 is maintained in the third position until the rotary actuator 202 is reactivated. When the valve disk 18 is in the third position, the valve openings 22 communicate with both the intake cavity to the left of line 51, over the valve housing transverse wall (located on line 51) and the exhaust cavity to the right of line 58. Thus, the gas flow entering the intake cavity through the inlet 43 passes directly over the valve housing transverse wall (located on line 51), enters the exhaust cavity, and exits the outlet 44. Even though the valve openings 22 communicate through the first and second ports 27 and 28 with the container, the gas flow through the openings 22 does not enter the container 40 because the gas pressure at the first port 27 is equal to the gas pressure at the second port 28. Thus, when the valve disk 22 is in the third position, the exhaust gases bypass the container 40.

Figure 6:
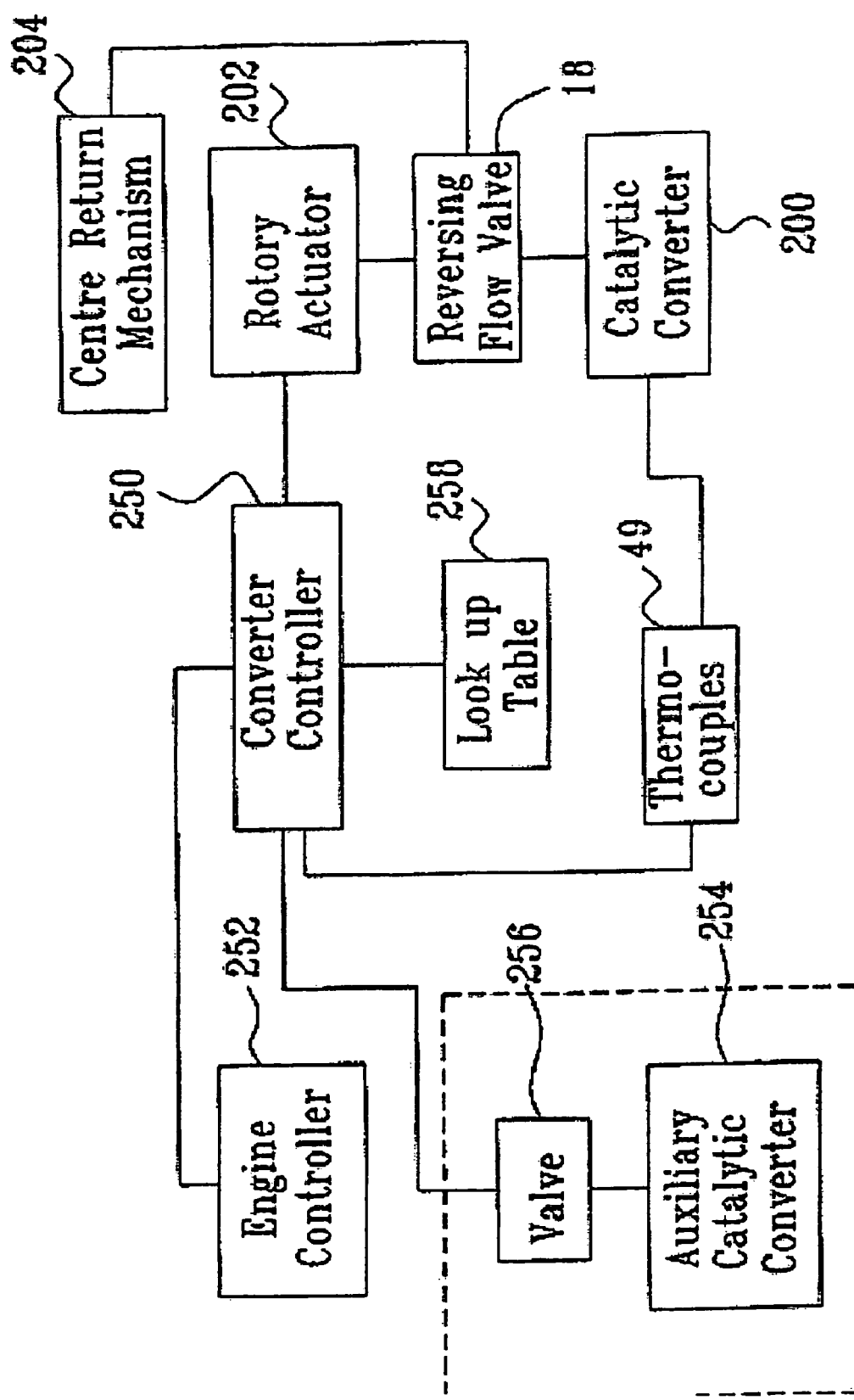
FIG. 6 is a block diagram illustrating the control system for the reversing flow valve of the embodiment of the invention shown in FIG. 1.

The catalytic converter 200 described above with reference to FIGS. 1 through 5c is preferably controlled by a control system, a preferred embodiment of which is illustrated in FIG. 6. During normal engine operation and normal reverse flow catalytic converter operation, a controller 250 monitors the temperature of the catalytic material in the catalytic converter. Thermocouples 49 attached to the catalytic converter 200, or imbedded in the catalytic material, are preferably used to measure temperatures of the catalytic material.

As long as the temperature measured is within a predetermined range, the controller controls the rotary actuator 202 to achieve cyclic reverse flow through the catalytic converter by periodically rotating valve 18 so that the reverse flow valve 18 is moved between the first and second positions. If an abnormally sharp rise in temperature is detected, or if the temperature of the catalytic material rises above a threshold that will predictably damage the catalytic material, the controller 250 enters the bypass mode. During the bypass mode, the controller 250 deactivates the rotary actuator 202. When the rotary actuator 202 is deactivated, the center return mechanism 204 forces the reverse flow valve 18 into the third position to cause the gas flow to bypass the catalytic converter 200, as described above with reference to FIG. 5c.

Exhaust flow bypass is a first safeguard action to prevent damage to the reversing flow catalytic converter. Adjusting engine fuel supply is another. Therefore, when the controller enters bypass mode, it sends a signal to the engine controller 252. The engine controller responds to the signal by adjusting the engine fuel supply to reduce total hydrocarbon and carbon monoxide volume in the exhaust gases.

As seen in FIG. 6, an auxiliary catalytic converter 254 connected in series to the engine exhaust system downstream of the reverse flow catalytic converter 200 may be optionally installed. During bypass mode, the controller 250 activates the valve 256 to direct the exhaust flow to pass through the auxiliary catalytic converter 254, which will oxidize at least a part of the carbon monoxide and hydrocarbons during the bypass mode. The auxiliary catalytic converter may be smaller and less expensive than the reversing flow catalytic converter 200.

A look-up table 258 may be accessed at the controller 250. The look-up table 258 stores data defining a dynamic limit of a rate of rise of the temperature of the catalytic converter 200. Each time the controller 250 samples the temperature of the catalyst using the thermocouples 49, the controller 250 calculates the dynamic rate of rise in the temperature and compares the dynamic rate of rise in the temperature with entries in the look-up table 258, to obtain an early indication of overheating in the catalyst. The controller 250 must promptly respond to an indication of overheating in the catalytic material. The more quickly the controller 250 responds to the prediction of overheating in the catalytic converter, the better the catalyst is protected. A quick response will protect the washcoat from damage whereas a delayed response may only protect the monolith from meltdown. The control system therefore needs to be sensitive enough to protect the washcoat most of time and invariably prevent meltdown of the monolith substrate. However, over-sensitivity will trigger catalyst protection when it is not required. Frequent triggering of unwarranted catalyst protection will compromise engine performance in the case of engine management-systems and unnecessarily increase emissions in the case where bypass protection is used.

The control algorithm used by the controller 250 therefore determines when to enter bypass mode based on catalyst temperature thresholds. Appropriate setting of the temperature thresholds will safeguard the catalyst from overheating provided there is a slow climb in catalyst temperature. However, static temperature thresholds are not sufficient to prevent the catalytic washcoat from damage if operating conditions cause a serious fuel management problem. Serious fuel management problems may result in a sustained rate of temperature rise over 20-30° C./second. Due to the inherent delay in temperature sensing and processing, and a slight delay in the response of the bypass mechanism, an early prediction of overheating is required to protect the washcoat.

It should be noted that only catalyst temperatures are used to predict overheating by the control algorithm. The catalyst temperature and the rate of temperature rise in the catalyst temperature are used by the control algorithm. The engine exhaust temperature is not measured or considered, because exhaust temperatures vary at a much greater rate than catalyst temperature variation during normal engine operating conditions.

As an example, described below is a safeguard system for preventing overheating of a reversing flow catalytic converter used for a diesel/natural gas duel fuel engine.

Three Type-K thermocouples were installed in the catalytic converter, one at each side of the boundary layers, that is, inside the catalyst substrate, and a third one at the bottom center of the container structure. Type-K thermocouples are commonly used to measure temperatures of 0° to 1250° C. in various industrial processes. For balancing control of a catalyst flow-path temperature profile, two boundary thermocouples are preferred so that heat is measured more efficiently. For catalyst overheat protection, the two boundary thermocouples and the central thermocouple are required to provide early warning of any fuel management faults. The control algorithm used by the controller 250 provides the system with the following functionality:

The reverse flow mode is terminated when all three thermocouples measure catalyst temperatures lower than 300° C. When any one of the three thermocouples measure a catalyst temperature higher than 350° C., the reverse flow mode is turned on.

The controller continuously computes rates of temperature rise in the catalyst and compares each computed rate of rise with predetermined values in the look-up table 258. The controller 250 triggers the system into bypass mode if a rate of temperature rise listed in the look-up table is exceeded by a computed rate. After entering bypass mode, the reverse flow catalyst converter is bypassed, as explained above. A prediction that the catalyst is about to overheat also triggers the engine controller 252 to switch to diesel mode. This shuts off the natural gas fuel supply and causes the engine controller to begin self-diagnostics. The engine controller 252 is also preferably programmed to operate the engine in a special diesel mode, in which the diesel injection timing is advanced as compared to normal diesel mode in order to lower engine exhaust temperature. The reverse flow mode is resumed after the catalyst has cooled down to a predetermined restart threshold, 580° C., for example. If each of thermocouples indicate temperatures that are lower than the restart threshold, and a catalyst damage flag has not been set, the reverse flow mode is resumed. The controller 250 sets a damage flag when any one of the thermocouples indicates a temperature that exceeds a temperature that might damage the catalyst. If a damage flag is set, the reverse flow mode is not resumed until the catalytic material has cooled to temperature below a predetermined threshold.

The effectiveness of the safeguard system is ensured by multiple thresholds and the combination of static and dynamic temperature tracking. A performance evaluation test for the safeguard system was conducted to test the effectiveness of the catalyst temperature control and the durability of control functionality under a wide range of engine and vehicle operating conditions, including fuel management system failures. Evaluation tests demonstrated that the safeguard system reliably activated each time the controller determined that protection mode was required. For slow temperature rise, the onset of the bypass mode was triggered by either inlet or outlet catalyst temperature readings exceeding the static temperature threshold. Test results showed that the onset of bypass mode almost immediately stopped monolith temperature rise under slow temperature rise conditions. If an abnormal rate of temperature rise triggers bypass mode, the onset of bypass mode rapidly reduces and subsequently reverses the temperature rise. The tests indicted that the safeguard system reliably prevented meltdown of the catalyst under these conditions.

The protection of the catalyst washcoat is more difficult, mainly because of the narrow line between optimized working catalyst temperatures and washcoat damage temperatures. The catalyst tested worked best when bed temperatures were maintained between 580° and 640° C. and peaked at 720° C. Catalyst ageing is accelerated above 730° C. and reactivity deteriorated over 760° C. If high concentrations of hydrocarbons are present in the exhaust gases, a flame may be sustained in the valve housing for some time during bypass mode. Under such circumstances, the cavity of the valve housing is the hottest zone and conducts heat to the top of the monolith. However, the flame does not propagate to the inside of the catalyst because bypass mode stops gas flow through the catalyst. Rapidly adjusting the engine fuel supply provides improved protection for the washcoat.

The replacement of the oxidation flow through catalyst with an oxidation particulate filter trap 260 is illustrated in FIG. 7. The oxidizing filter trap sections 260 are shown located near the center of the reactor core on both sides of the flow redirection bowl section 269. The sections immediately upstream and downstream of the central core sections 260 are sections 261 and may be an oxidizing catalytic section of monolith as used in the reverse flow oxidizing catalyst. Sections 262 may be sections of monolith without catalytic coating. When used with a diesel engine, the oxidizing filter trap sections 260 will trap and hold particulate matter to allow effective oxidation of the carbon kernel as well as the volatile organic fractions of the particulates.

Figure 8:
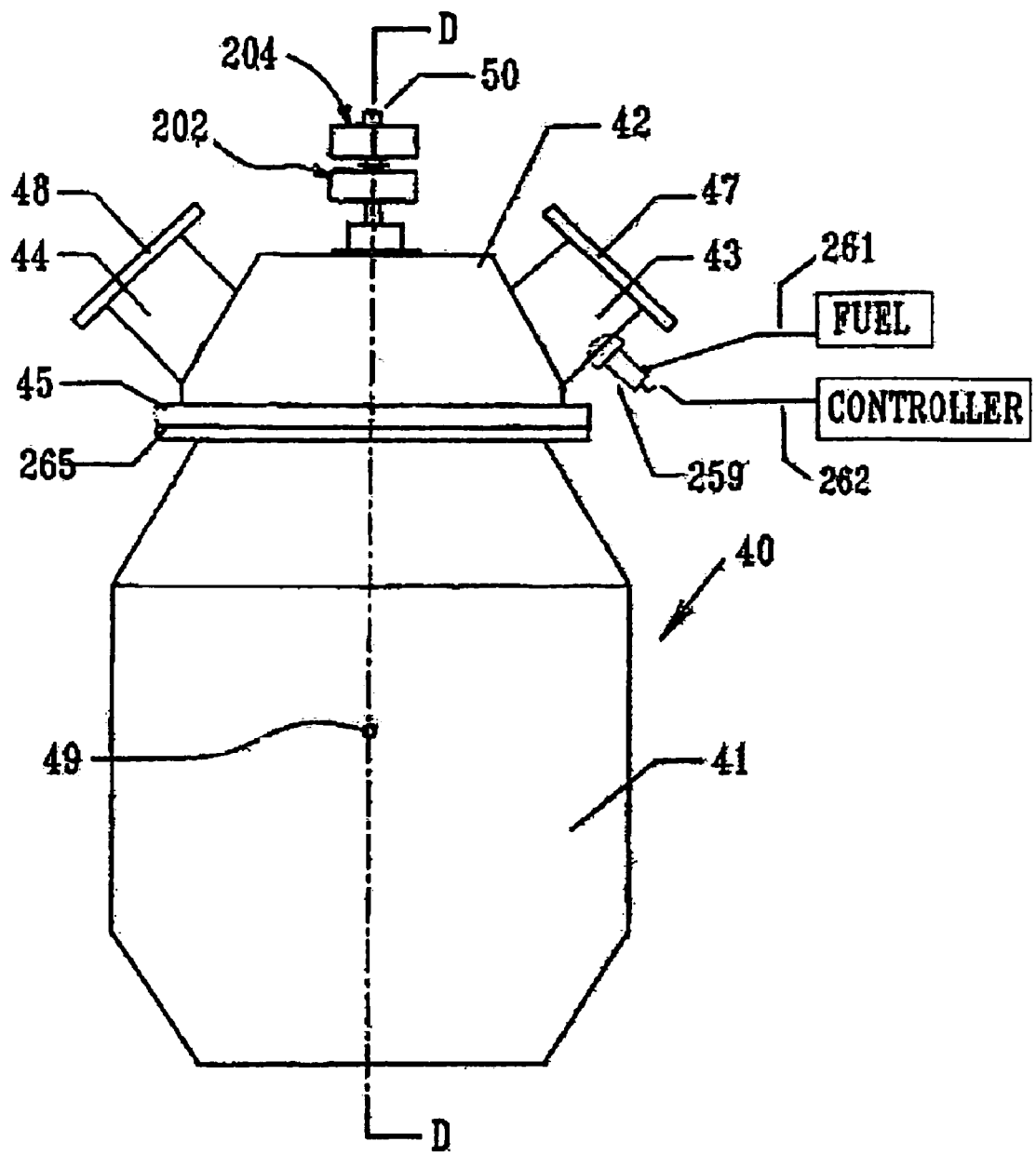
FIG. 8 is an elevational view of the preferred embodiment of an improved reverse flow catalytic converter showing a mounting location of an optional fuel injector valve for injecting fuel upstream of the reverse flow catalytic converter. The injector valve may alternatively be mounted in a spool piece immediately upstream of the converter inlet flange or midway through the catalytic converter flow path such that fuel is injected within the flow redirection bowl.

In FIG. 8, the location and mounting of a fuel injection valve 259 is illustrated at the inlet side 43 of the reverse flow oxidizing converter. For a dual fuel engine, it is not likely that supplementary fuel injection will be needed, but if it is deemed useful, the injector valve 259 will be one designed for gaseous fuel injection in time duration pulses. If the reverse flow oxidizing converter is to treat exhaust gases from a diesel engine, then the injector valve 259 will be one designed for diesel fuel injection as a fine mist. The injector valve 259 will have a fuel line 261 connected to it as well as a wiring harness for power to activate the injector valve 259 under command of the converter controller 250 shown in FIG. 9. Power will be applied to the injector valve 259 when the temperature profile is insufficient for oxidation and power will be locked off the injector valve 259 when the controller 250 is reacting to an overheat event. Alternatively, it may be preferable to install diesel injector valve 259 at a location such that the additional fuel is injected into the flow redirection bowl 269 (FIG. 7).

In the cases of both the oxidizing catalytic converter and the oxidizing catalytic filter, it may be feasible to reduce the amount of catalytic loading and maintain temperature at oxidizing levels by the use of incremental fuel injection by way of fuel injector valve 259. In the limit, with sufficient exhaust fuel injection, catalytic coating may not be required. The amount of catalytic material may be balanced against the amount of fuel consumed in a case by case assessment of each application.

Figure 9:
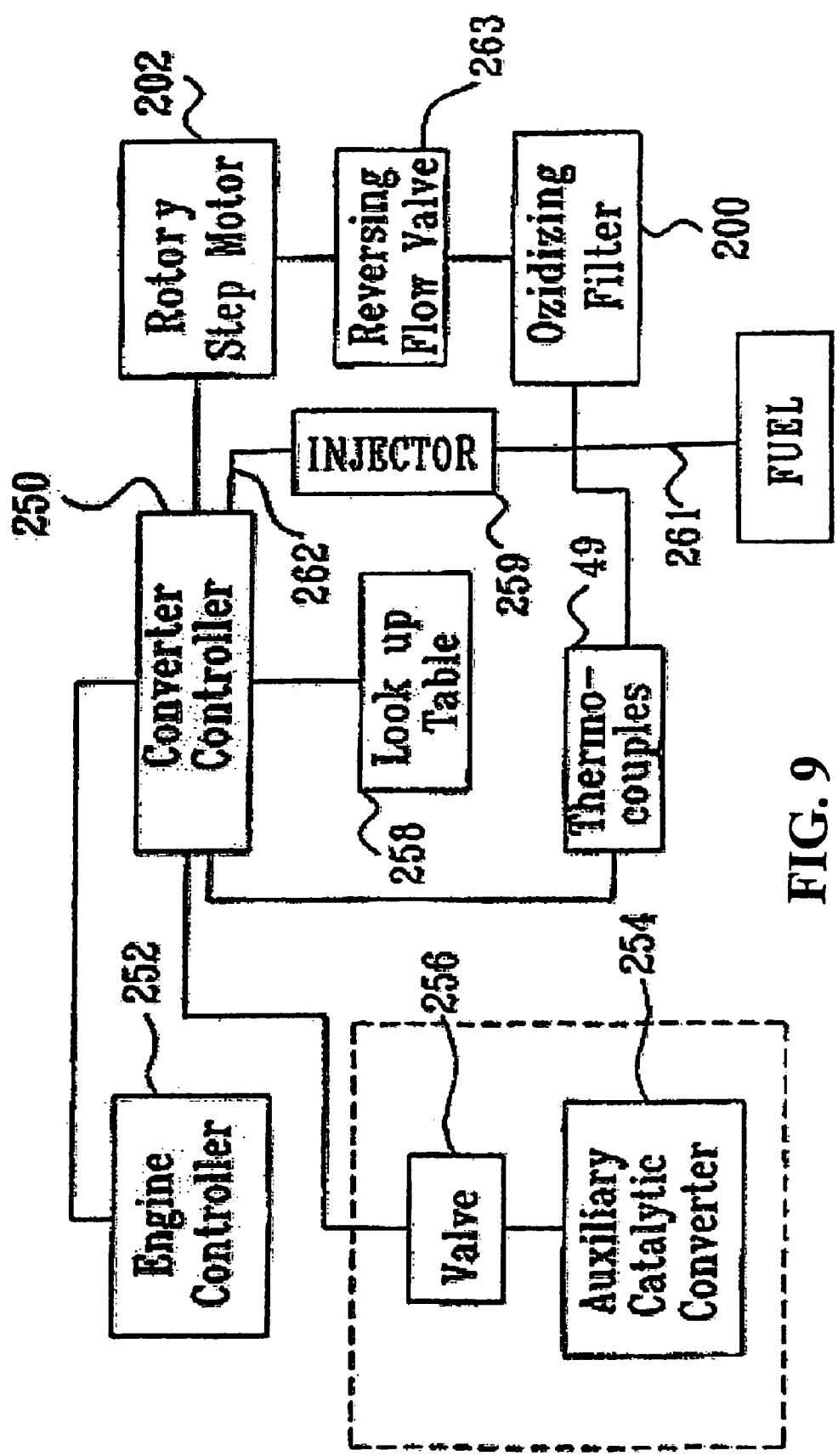
FIG. 9 is a block diagram illustrating the optional control system for the reversing flow oxidizing filter for the embodiment of the alternate invention shown in FIGS. 6 and 7.

The optional control schematic for the oxidizing particulate trap reverse flow controller 250 is illustrated in FIG. 9. When the thermocouples 49 detect a monolith temperature moving downward and approaching the catalytic light off temperature, the converter controller 250 will command the fuel injection valve 259 to pulse a metered volume of fuel 261 into the converter inlet piping 43 or redirection bowl 269. As the temperature moves upward from the added heat of the oxidizing fuel, the controller 250 will monitor the rate of temperature rise, and if below a selected threshold rate of rise, the controller will pulse more fuel into the converter. This action will continue until the monolith temperature is detected to be sufficiently above catalytic light off temperature to sustain continuous oxidation of particulate matter.- Under conditions of catalyst overheat, the power to the fuel injector 259 will be disconnected until the overheat event is over. The control algorithm earlier described will act on both static temperature measurements and rate of temperature rise calculations for the oxidizing filter monolith in the same manner as for the oxidizing flow through catalyst monolith.

Figure 10:
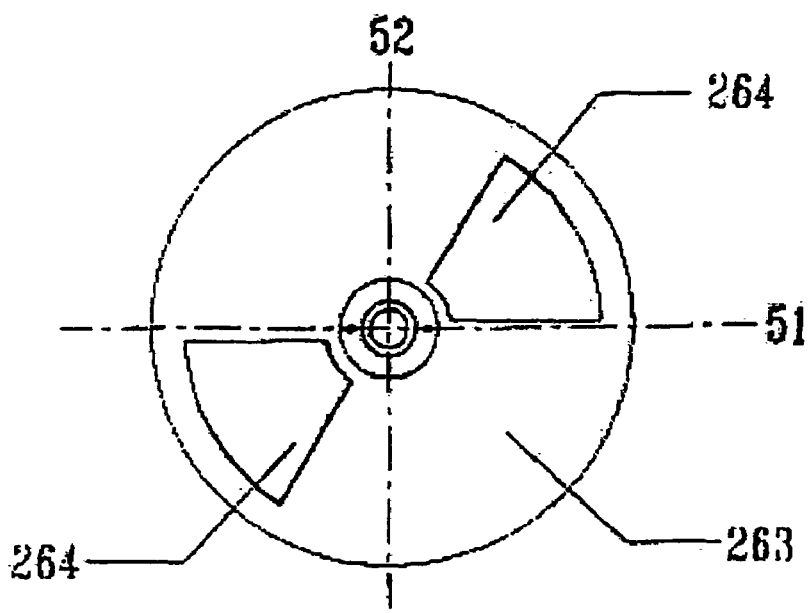
FIG. 10 is a top plan view of the valve disk optionally modified for utilization in a fourth position, showing the two openings reduced by about 30% therein compared to the improved three position oxidizing catalytic converter valve disk that is similar to the bottom plan view of the two position valve disk shown in FIG. 4 of U.S. Pat. No. 6,148,613.

The valve disk 263 as optionally modified for inclusion of the fourth or blocking position, is shown in FIG. 10. Both valve openings 264 have been reduced by about 30% in order to allow for the blocking position. When the internal combustion engine is shut down by moving the ignition key to the "off" position, the valve actuator will move the valve to the fourth or block position.

Figure 11:
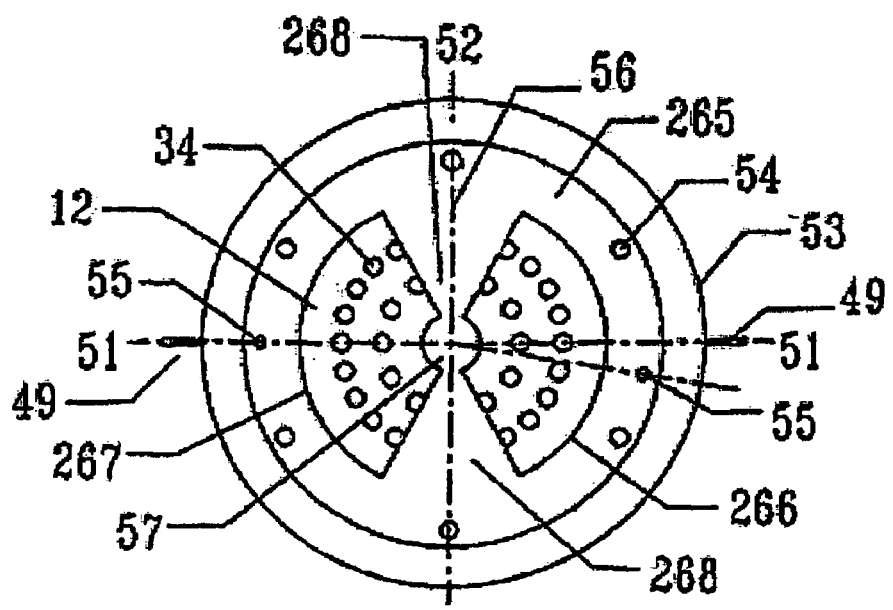
FIG. 11 is a top plan view of the container of the oxidizing filter taken along the line E-E of FIG. 7, showing the optionally modified adapter plate (or valve stator) made up of a ring and modified diametrical beam. This modified adapter plate flares out from the center to the ring in two diametrically opposed directions along the axis of the separating wall within the container, and reduces the area of each port by about 30% compared to the oxidizing catalytic converter adapter plate shown in FIG. 5 of U.S. Pat. No. 6,148,613. In doing so, the flared portion of the adapter plate creates a blocking area for the valve, when its reduced openings overlap the adapter plate in the flared area.

FIG. 11 shows the optionally modified adapter plate 265 and its smaller ports 266 and 267 which have also been reduced by about 30% to accommodate the blocking position when valve openings 264 are directly over the flared sections 268 of the diametrical beam. In this fourth position of the valve, the converter monolith is completely isolated and contained so that heat trapped within the monolith in the container, is maximally retained for the duration of the block position, or while the engine is shut down. Only when the engine ignition key is switched to start the engine, is the valve moved from the fourth or blocking position to the first or second position as required for forward or reverse flow.

Figure 12A:
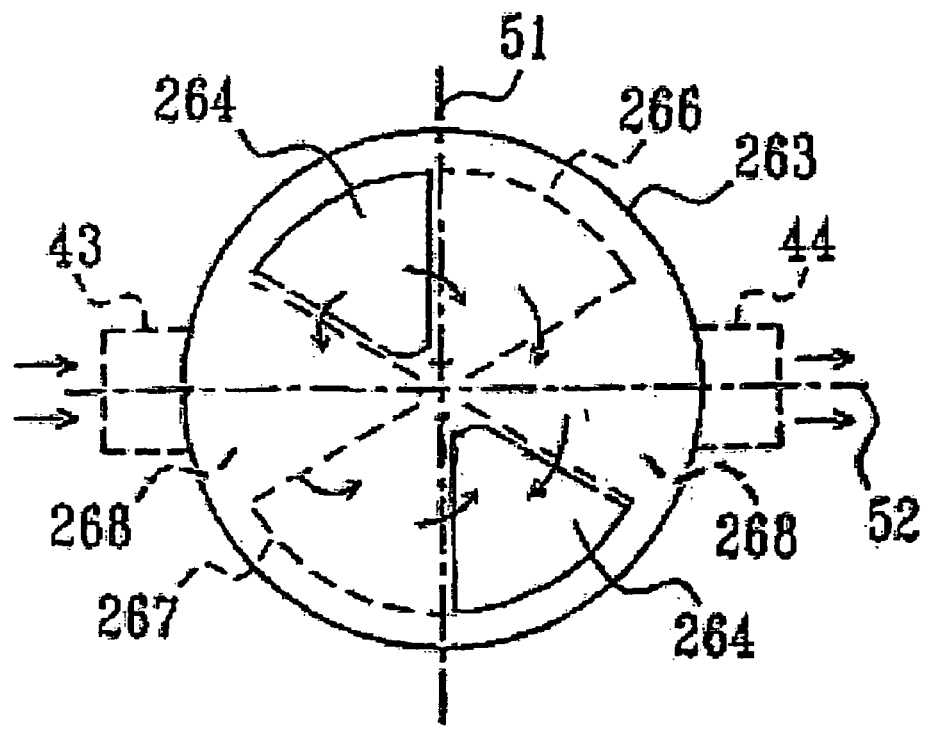
FIG. 12a is a bottom plan view of the optionally modified valve disk and housing with the adapter plate superimposed above the valve disk showing the valve disk in the first position in which exhaust gases are routed in a first direction through the filter trap.

FIG. 12a shows the first or forward flow position of the optionally modified valve wherein engine exhaust gas enters valve housing inlet pipe 43 into the valve housing inlet cavity and then passes through rotor valve opening 264 and then through port 267 (in phantom)in adapter plate 265 and then into and through the oxidizing filter, then through port 267 (in phantom) in adapter plate 265 and rotor valve opening 264 into the valve housing outlet cavity and finally to valve housing outlet pipe 44 and into the exhaust tail pipe.

Figure 12B:
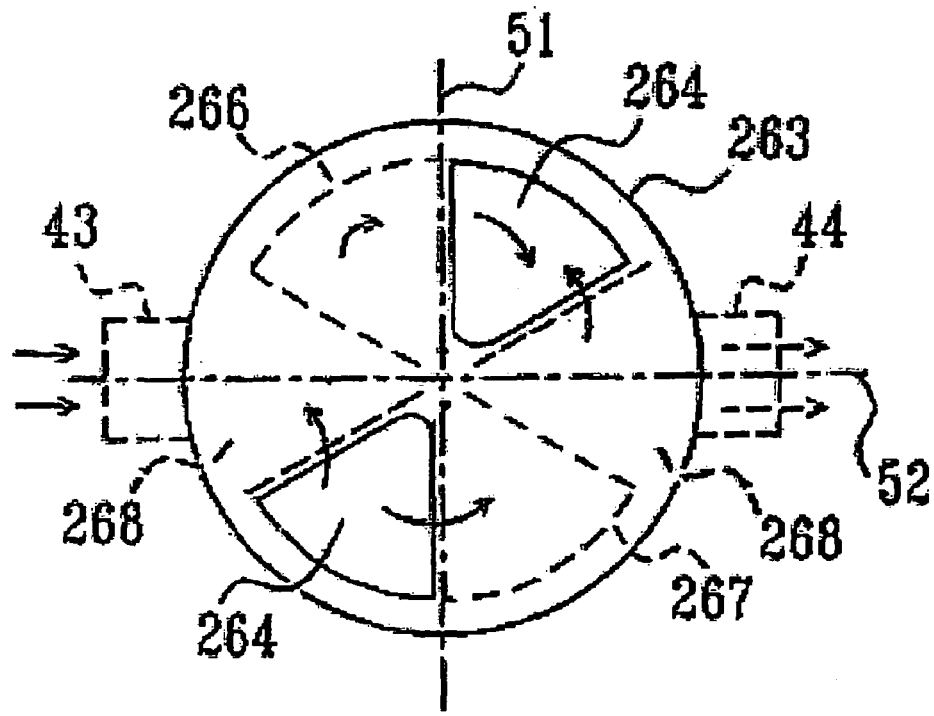
FIG. 12b is a bottom plan view of the optionally modified valve disk and housing with the adapter plate superimposed above the valve disk showing the valve disk in the second position in which exhaust gases are routed in a second or reverse direction through the filter trap.

FIG. 12b shows the second or reverse flow position of the optionally modified valve wherein engine exhaust gas enters valve housing inlet pipe 43 into the valve housing inlet cavity and then passes through rotor valve opening 264 and then through port 267 (in phantom) in adapter plate 265 and then into and through the oxidizing filter in a direction reversed from the forward flow direction, then through port 266 (in phantom) in adapter plate 265 and rotor valve opening 264 into the valve housing outlet cavity and finally to valve housing outlet pipe 44 and into the exhaust tail pipe.

Figure 12C:
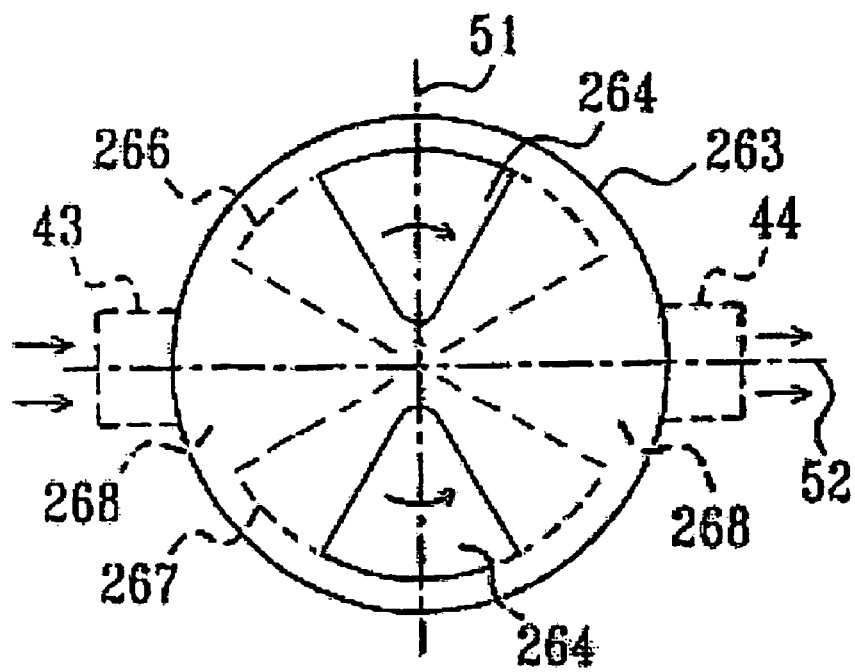
FIG. 12c is a bottom plan view of the optionally modified valve disk and housing with the adapter plate superimposed above the valve disk showing the valve disk in the third position in which exhaust gases bypass the filter trap.

FIG. 12c shows the third or bypass position of the optionally modified valve wherein the engine exhaust gas enters valve housing inlet pipe 43 into the valve housing inlet cavity and then passes through both valve openings 264 and 264 and both adapter plate ports 266 and 267 over the valve housing transverse wall and directly through adapter plate ports 266 and 267 and both valve openings 264 into the valve housing outlet cavity and then to valve housing outlet pipe 44 and into the exhaust tail pipe.

Figure 12D:
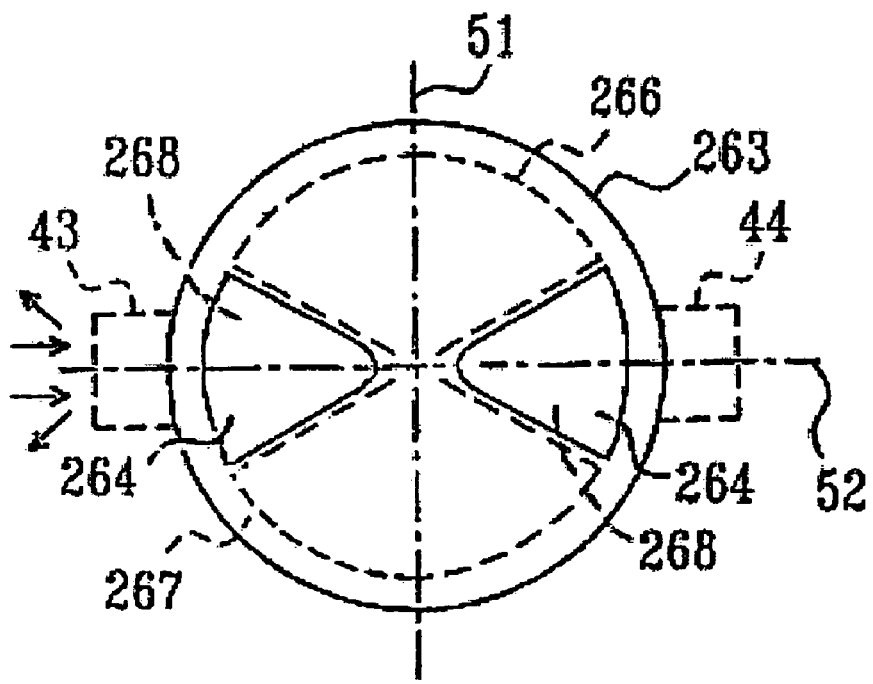
FIG. 12d is a bottom plan view of the optionally modified valve disk and housing with the adapter plate superimposed above the valve disk showing the valve disk in the fourth position in which the filter trap is completely enclosed and separated from the valve and the engine exhaust and tail pipe.

FIG. 12d shows the optional fourth or blocked flow position wherein after the engine is shut down, the ignition system signals the valve control system to position rotor valve openings 264 directly over the pie shaped flared areas 268 of the adapter plate 265 such that the oxidizing filter container is completely blocked and isolated allowing maximum heat retention within the container for the duration of engine shut down. Valve openings 264 will automatically be positioned to either the forward or reverse flow direction prior to engine start, providing the highest oxidizing filter temperature possible after shut down. For short engine shut downs such as prevalent with delivery vehicles or hybrid diesel electric vehicles, the filter monolith will achieve early oxidation after a short engine shut down.

The four position valve can also be optionally achieved by modifying the adapter plate 265 such that the diametrical beam connects to the ring of the adapter plate 265 as for the three way valve application but the flared or pie shaped portions 268 are extended from the center of the adapter plate 265 in two diametrically opposite directions along a diametrical line at right angles to the diametrical beam 56. With a valve rotor the same as for the four position valve described earlier in FIG. 11, the combination of modified valve rotor and optionally modified adapter plate will also act effectively the same as described in the text for FIG. 12*d*. There may be advantages in some applications for the optionally modified valve.

The advantages of the catalytic converter described above are apparent. No plumbing is required between the converter unit and the valve unit, which makes the catalytic converter compact and inhibits heat lose between the valve and the catalyst. The valve disk is rotated about a perpendicular axis, which provides a smooth and reliable valve operation in a minimum of space. The unique arrangement of the monolith series improves catalyst life and conversion performance. And the reversing exhaust gas flow ensures maximum efficiency of conversion by keeping the catalyst material uniformly heated to increase catalytic activity for pollutant reduction. Furthermore, the safeguard system used with the catalytic converter effectively safeguards the catalytic converter from damage due to overheating and effectively improves catalyst life. An additional advantage is the ability of the reverse flow catalytic converter to be optionally modified to work effectively and efficiently as a continuous oxidation particulate filter trap.

In view of the above, it will be seen that the several objects of the invention are achieved and other advantageous results attained. Various changes could be made in the above methods and constructions without departing from the scope of the invention, which is limited solely by the scope of the appended claims.

We claim:

1. A reversing flow catalytic converter for treating exhaust gases from an internal combustion engine comprising:
   a container having a gas flow passage therein and a top end having a first port and a second port that respectively communicate with the gas flow passage;
   a catalytic material in the gas flow passage adapted for contacting the exhaust gases that flow through the gas flow passage;
   a valve for reversing an exhaust gas flow through the gas flow passage, including
      a valve housing with an intake cavity and an exhaust cavity, mounted to the top end of the container, the intake cavity adapted for connection to an exhaust gas pipe from said engine and exhaust cavity adapted for connection to a tail pipe for egress of said exhaust gas from said converter; and
      a valve component for reversing gas flow operably mounted to the valve housing, having a rotatable disk with first and second openings therethrough, and adapted to be rotated between a first position in which the intake cavity communicates with the first port via the first opening and the exhaust cavity communicates with the second port via the second opening, a second position in which the intake cavity communicates with the second port via the first opening and the exhaust cavity communicates with the first port via the second opening, and a third position wherein the first and second openings each communicate with both the first and second ports which allows the intake cavity to communicate with the exhaust cavity; and
   a controller for controlling movement of the valve component between the first and second positions during normal operating temperatures for the catalytic converter and to the third to permit bypass of some exhaust gas without passing through said catalyst material during certain other temperatures for the catalytic converter.

2. A reversing flow catalytic converter as claimed in claim 1 wherein the valve housing comprises an enclosed cavity with an opening in a bottom thereof and a transverse wall that divides the cavity into two compartments that respectively form the intake cavity and the exhaust cavity.

3. A reversing flow catalytic converter as claimed in claim 2 wherein the disk is rotatably mounted to the valve housing at the opening in the bottom thereof and rotates about a central axis that is perpendicular to the disk, the disk in sealing and rotatable contact with the bottom of the transverse wall.

4. A reversing flow catalytic converter as claimed in claim 2 wherein each of the first and second openings in the disk in the third position communicates with both the intake cavity and the exhaust cavity so that the gas flow is not forced through the catalytic material in the container.

5. A reversing flow catalytic converter as claimed in claim 4 wherein the disk further comprises a drive shaft driven by an actuator means.

6. A reversing flow catalytic converter as claimed in claim 5 wherein the actuator is activated by the controller to rotate the disk between the first and second positions, and said third position.

7. A reversing flow the catalytic converter as claimed in claim 6 wherein the disk returns to and is maintained in the third position when the actuator is deactivated by the controller.

8. A reversing flow catalytic converter as claimed in claim 7 further comprising a center return mechanism associated with the drive shaft of the disk to maintain the disk in the third position, and adapted to be overridden by the actuator.

9. A reversing flow catalytic converter as claimed in claim 8 wherein the center return mechanism comprises of a dual-spring mechanism in which uneven spring forces produce a torque adapted to rotate the drive shaft until the disk is in the third position.

10. A reversing flow catalytic converter as claimed in claim 2 wherein the gas flow passage is formed within an interior chamber of the container, the interior chamber being separated by a transverse plate that forms a first chamber and a second chamber, the first and second chambers communicating with each other, and each of the chambers communicating with the first and second ports.

11. A reversing flow catalytic converter as claimed in claim 10 wherein the catalytic material is spaced below the first and second ports to form an empty chamber between the first and second ports and the catalytic material, the empty chamber being divided by the transverse plate into two separate compartments beneath the first and second ports, respectively, the valve housing of the valve being mounted to the top of the container in an orientation so that the container transverse plate is perpendicular to the valve transverse wall.

12. A reversing flow catalytic converter as claimed in claim 11 wherein the valve disk is positioned between the transverse wall and transverse plate, the valve disk being perpendicular to both the transverse wall and the transverse plate, and each of the two openings in the valve disk is smaller than a half section of each of the first and second ports of the adapter plate.

13. A reversing flow catalytic converter as claimed in claim 12 further comprising a mechanism for accurately positioning the valve on the top of the container and removeably securing same.

14. A reversing flow catalytic converter as claimed in claim 1 further comprising a sensor device for measuring temperatures of the catalytic material.

15. A reversing flow catalytic converter as claimed in claim 1 wherein the catalytic material is optionally a catalytic filter trap monolith.

16. A reversing flow catalytic converter as claimed in claim 15 wherein a fuel injector is affixed to the exhaust gas pipe and pulses fuel into the exhaust gas pipe with time duration pulses provided from a controller with an algorithm that is based on measuring monolith static temperature and on calculating monolith rate of temperature change and reacting to increase monolith temperature by the addition of fuel when determined necessary as dictated by the algorithm.

17. A reversing flow catalytic converter as claimed in claim 16 wherein the fuel injector is mounted on a pipe spool piece attached immediately upstream of an inlet flange to said inlet cavity.

18. A reversing flow catalytic converter as claimed in claim 17 wherein the fuel injector is mounted at the mid-point of the converter such that fuel is injected into the cavity of the flow redirection bowl.

19. A reversing flow catalytic converter as claimed in claim 18 wherein the catalytic material is optionally replaced by a filter monolith without catalytic coating.

20. A reversing flow catalytic converter as claimed in claim 19 wherein a circular adapter plate is attached to the container and has two semi circular and diametrically opposed ports each subtended by an approximately 120 degree angle of opening and the openings extend from near the adapter plate center, at an approximate radius of the disk hub, to the inner radius of the adapter plate ring with the orientation of the center line diameter bifurcating the center of the two 120 degree ports being at right angles to the container transverse wall such that each port communicates only with one side of the container as divided by the container transverse wall.

21. A reversing flow catalytic converter as claimed in claim 20 wherein the valve structure is mounted on the adapter plate in such a way that a transverse wall of said valve structure separating the inlet and exhaust cavities is at right angles, as guided by positioning pins in the adapter plate, to a container transverse wall.

22. A catalytic converter as claimed in claim 20 wherein a valve disk with two semi-circular and diametrically opposed openings is provided, said openings subtended by an approximately 60 degree angle of opening from the center of the disk and extending from a radius of the disk slightly larger than the disk hub to a radius slightly smaller than the adapter plate ring such that the adapter plate ports and the valve disk openings optimally overlie each other with minimum leakage when in operation.

23. A reversing flow catalytic converter as claimed in claim 22 wherein the valve disk is adapted to be rotated by a perpendicular shaft that is connected at the disk end to the disk hub, and at the opposite end coupled to an electric stepper motor actuator that is attached to the valve structure and that rotates the valve disk, as directed by the controller that activates the stepper motor actuator, to at least four operating positions, namely a position to permit:

forward flow
reverse flow
bypass flow; or
blocked flow.

24. A reversing flow catalytic converter as claimed in claim 23 wherein the stepper motor is a pneumatic stepper motor.

25. A reversing flow catalytic converter as claimed in claim 24 wherein a controller provides power to move and position the valve disk in each of the operating positions based on an algorithm embedded in the controller, the controller acting upon temperature measurements sent to it from sensors embedded in the filter monolith.

26. A safeguard system for a reversing flow catalytic converter to inhibit overheating of a catalytic material used to treat the exhaust gases from an internal combustion engine, the reversing flow catalytic converter including:
    a container having a gas flow passage therein and a top end having a first port and a second port that respectively communicate with the passage;
    a catalytic material in the gas flow passage adapted to contact the exhaust gases which flow through the passage; and
    a valve mechanism for reversing an exhaust gas flow through the gas flow passage, including
        a valve housing with an intake cavity and an exhaust cavity, mounted to the top end of the container, the intake cavity adapted for connection to an exhaust gas pipe of said engine and the exhaust cavity being adapted for connection to a tail pipe to permit egress of exhaust gases from said converter,
        the valve mechanism further including a valve component for reversing gas flow operably mounted to the valve housing, the valve component having a rotatable disk with first and second openings therethrough, and being actuated by an actuator to move between a first position in which the intake cavity communicates with the first port via the first opening and the exhaust cavity communicates with the second port via the second opening, and a second position in which the intake cavity communicates with the second port via the first opening and the exhaust cavity communicates with the first port via the second opening, and a third position wherein the first and second openings each communicate with both the first and second ports which allows the intake cavity to communicate with the exhaust cavity
the system comprising:
    at least one temperature sensor for measuring a temperature of the catalytic material in the container; and
    a controller for controlling movement of the valve component between the first and second positions.

27. A safeguard system as claimed in claim 26 further comprising a center return mechanism for moving the valve component to and maintaining the valve component in the third position when the controller deactivates the actuator.

28. A safeguard system as claimed in claim 27 wherein the controller is adapted to deactivate the actuator to stop the normal reversing flow operation and send a signal to an engine controller to adjust the fuel supply to the engine when a rate of rise of the temperature of the catalytic material is higher than a predetermined threshold retrieved from a look-up table.

29. A safeguard system as claimed in claim 28 wherein the controller is adapted to deactivate the actuator to stop normal reversing flow operation and send a signal to an engine controller to adjust the fuel supply to the internal combustion engine when the temperature of the catalytic material exceeds a third predetermined threshold.

30. A safeguard system as claimed in claim 29 further comprising an auxiliary catalytic converter connected thereto for treating the exhaust gases only when the exhaust gases bypass the reverse flow catalytic converter.

31. A safeguard system as claimed in claim 26 for the reversing flow catalytic converter wherein the controller is adapted to move and position the valve disk to a bypass position and send a signal to an engine controller to adjust the fuel supply to the internal combustion engine when a rate of rise of the temperature of a filter monolith is higher than a predetermined threshold retrieved from a look-up table embedded in the controller.

32. A safeguard system as claimed in claim 31 for the reversing flow catalytic converter wherein the controller is adapted to move and hold the valve disk to a bypass position and send a signal to an engine controller to adjust the fuel supply to an internal combustion engine when the temperature of the filter monolith exceeds a third predetermined threshold.

33. A safeguard system as claimed in claim 32 for the reversing flow catalytic converter further comprising an auxiliary catalytic converter connected thereto for treating the exhaust gases only when the exhaust gases bypass the reversing flow catalytic converter.

34. A safeguard system as claimed in claim 33 for the reversing flow catalytic converter wherein the controller is adapted to move the valve disk to a block position in order to retard heat loss from the monolith when the engine ignition key is turned to the off position and the engine is shut down, and to move the valve disk to a forward or reverse flow position to resume normal operation when the ignition key is turned to the on position.

35. A safeguard system as claimed in claim 32 for the reversing flow catalytic converter wherein during an overheating event said system will cause power to be blocked from the fuel injector by an interlock between the controller and injector valve.

36. A reversing flow catalytic converter incorporating the safeguard system as claimed in any of claims 26-30.

37. A method for preventing overheating of a catalytic material in a reversing flow catalytic converter which is used for treating exhaust gas from an internal combustion engine which converter includes a valve for controlling an exhaust gas flow through a catalytic material in the container, the method comprising
periodically measuring the temperatures of the catalytic material;
periodically calculating a rate of rise of the temperature of the catalytic material using the temperatures measured; and
controlling the exhaust gas flow to bypass the catalytic material when the rate of rise of the temperature of the catalytic material exceeds a pre-determined threshold.

38. A method as claimed in claim 37 further comprising a step of:
adjusting engine operation to reduce oxidyzable components in the exhaust gases when the rate of rise of the temperature of the catalytic material exceeds the predetermined threshold.

39. A method as claimed in claim 38 further comprising a step of:
adjusting engine operation to reduce total hydrocarbon and carbon monoxide volume in the exhaust gases when the rate of rise of the temperature of the catalytic material exceeds the predetermined threshold.

40. A method as claimed in claim 37 wherein the predetermined threshold of the rate of rise of the temperature is determined by comparing a rate of temperature rise of the catalytic material and an instant temperature of the catalytic material with corresponding entries in a look-up table.

41. A method as claimed in claim 37 further comprising a step of:
adjusting engine operation to reduce total hydrocarbon and carbon monoxide volume in the exhaust gases when the rate of rise of the temperature of the catalytic material exceeds the predetermined threshold.

42. A method as claimed in claim 37 further comprising a step of:
directing the exhaust gases through in an auxiliary catalytic converter when the exhaust gases bypass the reverse flow catalytic converter.

43. A method as claimed in claim 37 further comprising a step of:
actuating and resuming normal control of the exhaust gas flow through the catalytic material in the container when an instant temperature of the catalytic material drops below the predetermined threshold.

44. A valve structure for a reversing flow catalytic converter for exhaust gases, the converter having a container which has a top end with a first port and a second port which are in fluid communication with each other so that the exhaust gases introduced into one of the first and second ports flows through a catalytic material in the container, comprising:
a valve housing including an intake cavity and an exhaust cavity, adapted to be mounted to the top end of the container, the intake cavity adapted for connection to an engine exhaust gas pipe of said engine and the exhaust cavity being adapted for connection to a tail pipe to permit egress of exhaust gases from said converter;
a valve component for reversing gas flow operably mounted in the valve housing and having a rotatable disk with first and second openings therethrough, and adapted to be moved between a first position in which the intake cavity communicates with the first port via the first opening and the exhaust cavity communicates with the second port via the second opening and a second position in which the intake cavity communicates with the second port via the first opening and the exhaust cavity communicates with the first port via the second opening, and a third position wherein the first and second openings each communicate with both the first and second ports which allows the intake cavity to communicate with the exhaust cavity.

45. A valve structure as claimed in claim 44 wherein the valve housing includes a transverse wall that divides the cavity into two compartments that respectively form the intake cavity and the exhaust cavity.

46. A valve structure as claimed in claim 45 wherein the valve disk is rotatably mounted to a bottom of the valve housing, and rotates about a central axis that is perpendicular to the valve disk, the valve disk in sealing and rotatable contact with the bottom of the transverse wall.

47. A valve structure as claimed in claim 46 wherein the first and second ports of the adapter plate are substantially semi-circular in plan view and the intake and exhaust cavities of the valve housing are also substantially semi-circular in cross-section but offset at 90° with respect to the ports, and each of the openings in the valve disk is shaped to communicate with only one of the ports and one of the cavities when the valve disk is in one of the first and second positions.

48. A valve structure as claimed in claim 47 wherein each of the openings in valve the disk is adapted to communicate with both the intake port and the exhaust port when the valve component is in the third position.

49. A valve structure as claimed in claim 48 wherein the disk further comprises a drive shaft affixed to the central axis, extending axially through the valve housing with one end projecting from the top of the valve housing.

50. A valve structure as claimed in claim 49 wherein the valve housing further comprises a mechanism for accurately positioning the valve housing on the top of the container and removebly securing the same.

51. A valve structure as claimed in claim 50 wherein the semi-circular shape of the intake and exhaust cavities and the semi-circular shape of the ports are substantially identical, and each of the openings in the valve disk is slightly smaller than half the area of the semi-circular cross-section of the ports, the openings in the disk being oriented at an angle of 180° with respect to each other.

52. A valve structure as claimed in claim 51 further comprising a rotary actuator operablely associated with drive shaft at the projecting end, the rotary actuator being adapted to override the center return mechanism.

53. A valve structure as claimed in claim 52 wherein the center return mechanism includes a dual-spring system in which uneven spring forces produce a torque adapted to rotate the drive shaft until the disk is in the third position.

54. A reversing flow catalytic converter incorporating the valve structure as darned in claim 44, said converter having a container that has a top end with a first port and a second port that are in fluid communication with each other so that the exhaust gases introduced into one of the first and second ports flow through a catalytic material in the container and pass out of the container through the other second or first port, is substantially described.

55. A valve structure as claimed in claim 52 wherein the valve component includes:
   a center return mechanism associated with the valve component for moving the valve component to and maintaining the valve component in a third position in which exhaust gases are conveyed from the intake cavity to the exhaust cavity without passing through the catalytic material.

56. A valve structure as claimed in claim 50 wherein the semi-circular shape of the intake and exhaust cavities extends over a 180 degree angle and the semi-circular shape of the adapter plate ports extends over a 120 degree angle, and each of the openings in the valve disk is slightly smaller than half the area of the semi-circular cross-section of each adapter plate port, the openings in the disk being oriented at an angle of 180 degrees with respect to each other.

57. A reversing flow catalytic converter incorporating the valve structure as claimed in any of claims 44-55.

* * * * *